United States Patent
Wu

(10) Patent No.: US 6,393,970 B1
(45) Date of Patent: May 28, 2002

(54) GRILL DEVICE

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 10/005,525

(22) Filed: Dec. 4, 2001

Related U.S. Application Data

(63) Continuation-in-part of application No. 09/960,577, filed on Sep. 20, 2001.

(51) Int. Cl.[7] .......................... A47J 37/00; A47J 37/04; A47J 37/07
(52) U.S. Cl. .............................. 99/331; 99/340; 99/349; 99/375; 99/378; 99/400; 99/444; 99/446
(58) Field of Search ........................... 99/331–333, 340, 99/339, 349, 353–355, 372–382, 400, 401, 444–450, 482; 126/41 R, 25 R, 9 R

(56) References Cited

U.S. PATENT DOCUMENTS

| | | | | | |
|---|---|---|---|---|---|
| 3,880,064 | A | * | 4/1975 | Martinex ...................... | 99/349 |
| 4,972,766 | A | * | 11/1990 | Anetsberger ................. | 99/332 |
| 5,473,976 | A | * | 12/1995 | Hermansson ................ | 99/349 |
| 5,531,155 | A | * | 7/1996 | Pellicane et al. ............. | 99/372 |
| 5,555,794 | A | * | 9/1996 | Templeton et al. ........... | 99/349 |
| 5,655,434 | A | * | 8/1997 | Liebemann ................... | 99/353 |
| 5,676,046 | A | * | 10/1997 | Taber et al. .................. | 99/340 |
| 5,755,150 | A | * | 5/1998 | Matsumoto et al. .......... | 99/372 |
| 5,771,782 | A | * | 6/1998 | Taber et al. ............... | 99/385 X |
| 5,802,958 | A | * | 9/1998 | Hermansson ............. | 99/379 X |
| 5,839,359 | A | * | 11/1998 | Gardener ...................... | 99/349 |
| 5,881,634 | A | * | 3/1999 | Newton .................... | 99/379 X |
| 5,890,419 | A | * | 4/1999 | Moravec ...................... | 99/349 |

* cited by examiner

*Primary Examiner*—Timothy F. Simone
(74) *Attorney, Agent, or Firm*—Brinks Hofer Gilson & Lione

(57) ABSTRACT

A grill device includes two independently controllable cooking sets confining two isolated cooking spaces such that two different meat pieces can be grilled therein under different cooking temperatures at the same time. Each of the cooking sets has a cooking plate provided with first and second grill ribs alternately disposed thereon. The first grill rib has a horizontal flat portion and a curved portion extending curvedly and downwardly from the flat portion. The second grill rib has a horizontal flat portion, and a curved portion extending curvedly and upwardly from the flat portion. The curved portion of the second grill rib has an elevation higher than those of the flat portions of the first and second ribs to prevent sliding out a meat piece from the cooking plate when the meat piece is disposed on the flat portions of the first and second grill ribs.

4 Claims, 2 Drawing Sheets

GRILL DEVICE

CROSS-REFERENCE TO RELATED APPLICATION

This application is a Continuation-in-Part (CIP) of co-pending U.S. patent application Ser. No. 09/960,577 filed by the applicant on Sep. 20, 2001 pending.

The invention relates to a grill device, more particularly to a grill device which has a plurality of parallel uniformly spaced apart first and second grill ribs alternately disposed on a cooking surface of the grill device.

The object of this invention is to provide a grill device which has a plurality of first and second grill ribs which permit easy cleaning of the first and second grill ribs and the cooking surface of the grill device.

Accordingly, a grill device of the present invention includes a horizontal lower grill unit, a horizontal upper grill unit, a connecting unit, and a pair of control switches. The lower grill unit has rear and front sides, and is provided with two lower cooking members. The upper grill unit is in the form of two independent upper halves, which are superposed on the lower grill unit so as to dispose each of the upper halves at a closed position with respect to the lower grill unit. Each of the upper halves has a rear side and an upper cooking member which is registered with and which is electrically coupled to a respective one of the lower cooking members of the lower grill unit. The connecting unit interconnects the rear sides of the lower grill unit and the upper halves of the upper grill unit in such a manner that each of the upper halves can be turned rearward from the closed position to an open position, in which a respective one of the upper halves is generally perpendicular to the lower grill unit. Each of the control switches is operable so as to control actuation and cooking temperature of a respective one of the lower cooking members in the lower grill unit and the upper cooking member in a corresponding one of the upper halves. Each of the lower cooking members further includes a cooking plate, a heating member, and a plurality of parallel uniformly spaced apart first and second grill ribs. The cooking plate has a cooking surface extending between the rear and front sides of the lower grill unit. The heating member is disposed below the cooking plate. The first and second grill ribs are alternately disposed on the cooking surface, and extend between the front and rear sides of the lower grill unit. Each of the first and second grill ribs has a top surface above the cooking surface and a front end with a front edge terminating adjacent to the front side of the lower grill unit. The top surface of each of the first grill ribs has a flat portion which extends horizontally from the rear side of the lower grill unit to a position adjacent to the front end of the first grill rib, and a curved portion which extends curvedly and downwardly from the flat portion to the front edge of the front end of the first grill rib. The top surface of each of the second grill ribs has a flat portion which extends horizontally from the rear side of the lower grill unit to a position adjacent to the front end of the second grill rib, and a curved portion which extends curvedly and upwardly from the flat portion to the front edge of the front end of the second grill rib. The curved portion of the second grill ribs have an elevation higher than those of the flat portions of the first and second grill ribs so as to be adapted to prevent a meat piece from sliding off the lower grill unit when the meat piece is disposed on the flat portions of the first and second grill ribs.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
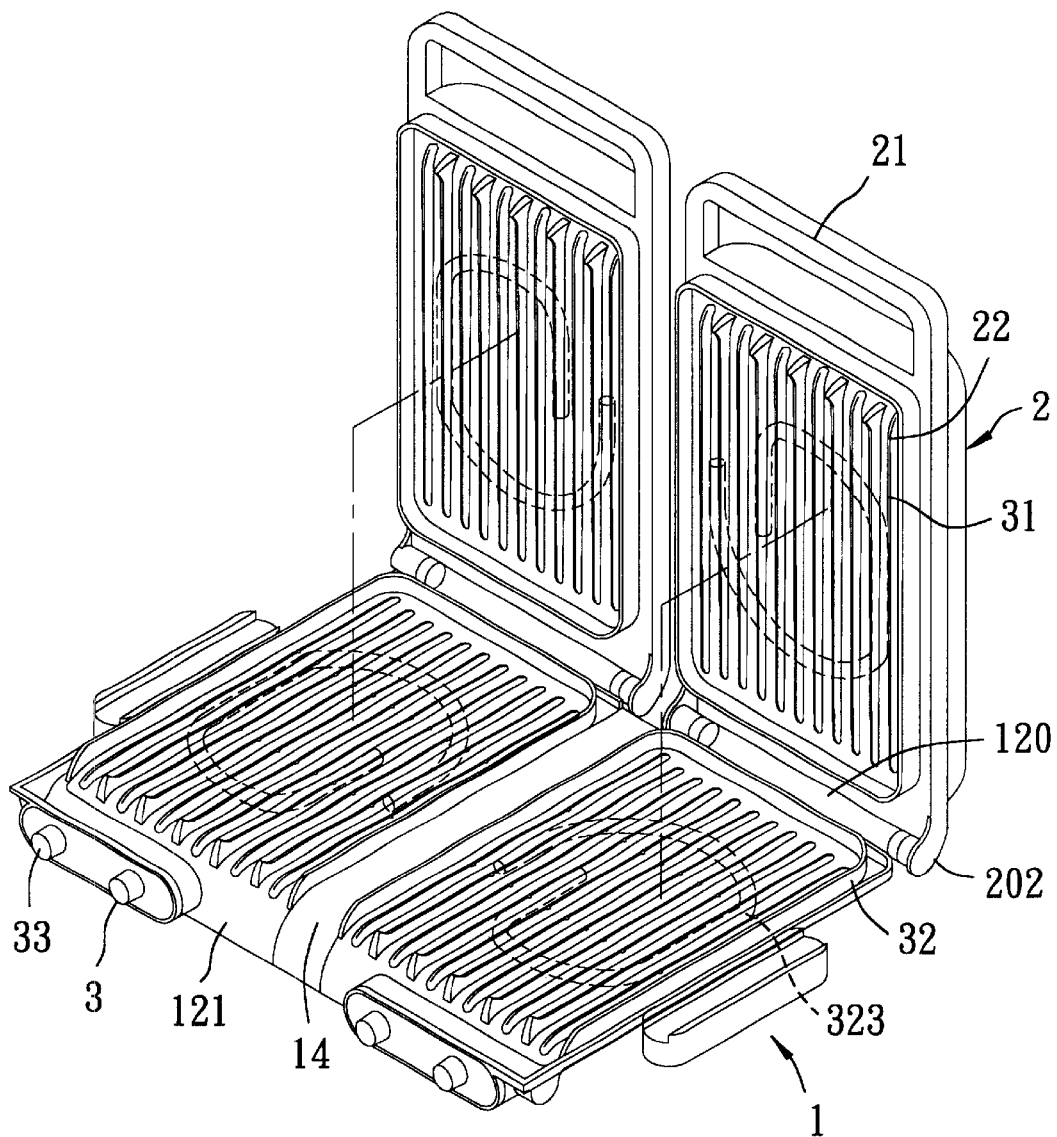
FIG. 1 is a perspective view of the preferred embodiment of a grill device of the present invention at an open position.

Referring to FIG. 1, the preferred embodiment of a grill device of the present invention is shown to include a horizontal single-piece lower grill unit 1 with a rear side 120, a horizontal upper grill unit 2 with a rear side 220, a connecting unit, and a pair of control switches 3.

As illustrated, the lower grill unit 1 has a base 11 with front and rear sides, and a top 12 that is provided with two lower cooking members 32.

The upper grill unit 2 includes two independent upper halves 21, each of which is superposed on the lower grill unit 1 so as to dispose each of the upper halves 21 at a closed position with respect to the lower grill unit 1. Each of the upper halves 21 has a bottom 22 that is provided with an upper cooking member 31 which is registered with and which is electrically coupled to a respective one of the lower cooking members 32 of the lower grill unit 1.

The connecting unit interconnects the rear sides 120,220 of the lower grill unit 1 and the upper halves 21 in such a manner that each of the upper halves 21 can be turned rearward from the closed position to an open position, in which a respective one of the upper halves 21 generally perpendicular to the lower grill unit 1, as best shown in FIG. 1. Since the particular connection between the upper halves 21 and the lower grill unit 1 is not pertinent to the claimed invention, a detailed structure of the same is omitted herein for the sake of brevity.

Each of the control switches 3 is operable in a known manner so as to control actuation and cooking temperature of a respective one of the lower cooking members 32 of the lower grill unit 1 and the upper cooking member 31 of a corresponding one of the upper halves 21. An insulator spacer 14 is disposed between the lower cooking members 32 so as to form two isolated cooking spaces that are confined by the upper halves 21 and the lower cooking members 32. In this embodiment, the control switches 3 are mounted on the lower grill unit 1 at two sides of the insulator spacer 14, and are respectively provided with a temperature control knob 33.

Figure 2:
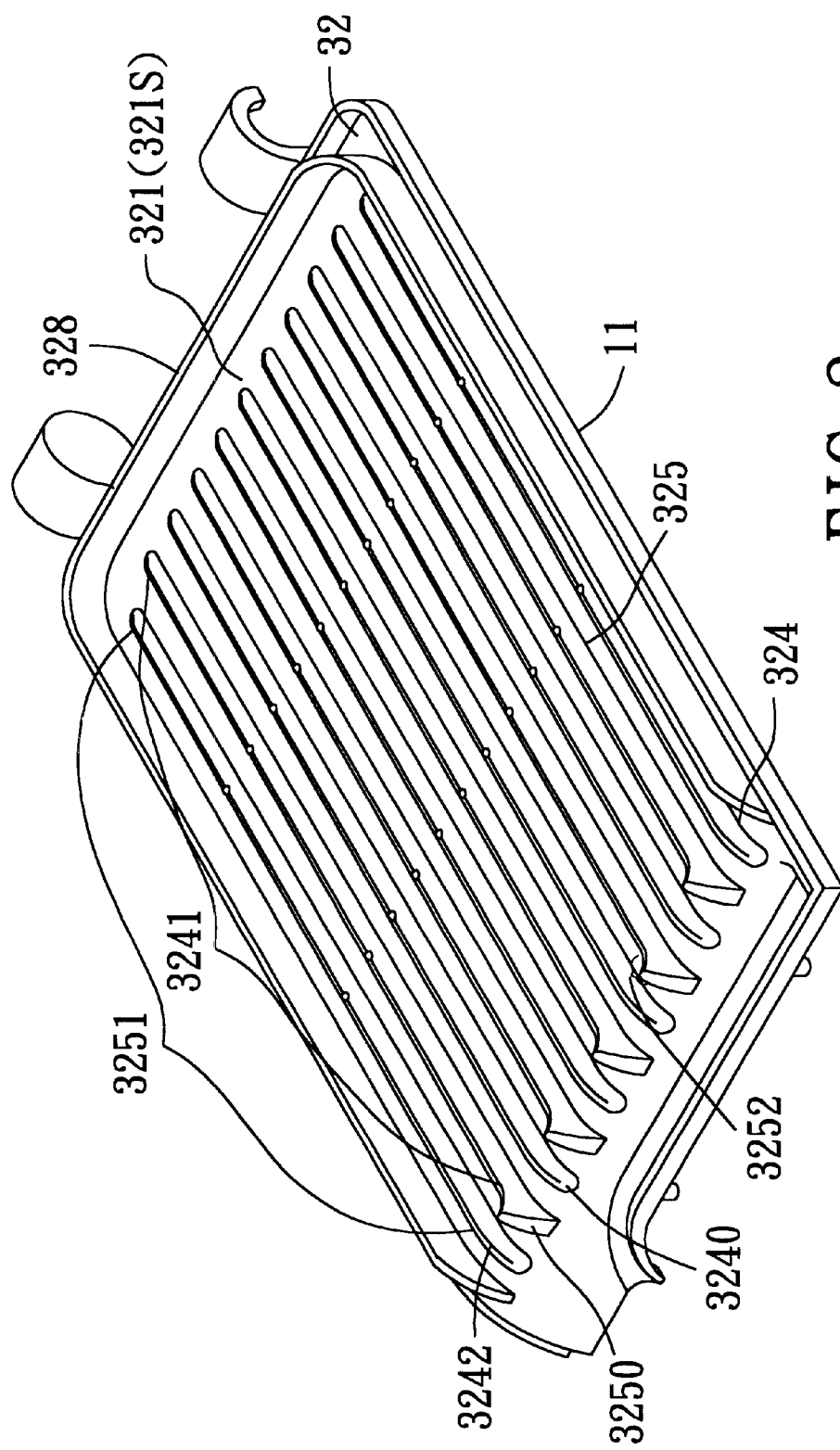
FIG. 2 is an enlarged perspective view of a cooking member employed in a lower grill unit of the preferred embodiment.

Referring to FIG. 2, each of the lower cooking members 32 further includes a cooking plate 321, a heating member 323 (see FIG. 1), and a plurality of parallel uniformly spaced apart first and second grill ribs 324,325. The cooking plate 321 has a cooking surface 321S that extends between the rear side and the front side. The heating member 323 is disposed below the cooking plate 321. The first and second grill ribs 324,325 are alternately disposed on the cooking surface 321S, and extend between the front and rear sides of the lower grill unit 1. Each of the first and second grill ribs 324,325 has a top surface and a front end with a front edge terminating adjacent to the front side of the lower grill unit 1. The top surface of each of the first grill ribs 324 has a flat portion 3241 extending horizontally from the rear side of the lower grill unit 1 to a position adjacent to the front end of the first grill rib 324, and a curved portion 3242 that extends curvedly and downwardly from the flat portion 3241 to the front edge of the first grill rib 324. The top surface of each of the second grill ribs 325 has a flat portion 3251 extending horizontally from the rear side of the lower grill unit 1 to a position adjacent to the front end of the second grill rib 325, and a curved portion 3252 that extends curvedly and upwardly from the flat portion 3251 to the front edge of the second grill rib 3252, and that has an elevation higher than those of the flat portions 3241,3251 of the first and second grill ribs 324,325 so as to prevent a meat piece (not shown) from sliding out of a respective one of the cooking members 32 in the lower grill unit 1 when the meat piece (not shown) is disposed over the flat portions 3241,3251 of the first and second grill ribs 324,325.

Preferably, the cooking surface 321S of the cooking plate 321 inclines gradually from the rear side toward the front side of the lower grill unit 1 to facilitate downflow of oil resulted by virtue of grilling action of the meat piece. A confining-wall 328 is disposed on the cooking surface 321S of the cooking plate 321 to confine the first and second grill ribs 324,325 therein.

Since adjacent front ends of the second grill ribs 325 are spaced by the downwardly curved portion 3242 of the first grill rib 324, cleansing operation therebetween is consequently facilitated.

With this invention thus explained, it is apparent that numerous modifications and variations can be made without departing from the scope and spirit of this invention. It is therefore intended that this invention be limited only as indicated in the appended claims.

I claim:

1. A grill device comprising:
    a horizontal single-piece lower grill unit having a rear side, and a front side, and provided with two lower cooking members;
    a horizontal upper grill unit in the form of two independent upper halves superposed on said lower grill unit so as to dispose each of said upper halves at a closed position with respect to said lower grill unit, each of said upper halves having a rear side and an upper cooking member which is registered with and which is electrically coupled to a respective one of said lower cooking members of said lower grill unit;
    a connecting unit interconnecting said rear sides of said lower grill unit and said upper halves in such a manner that each of said upper halves can be turned rearward from said closed position to an open position, in which a respective one of said upper halves is generally perpendicular to said lower grill unit; and
    a pair of control switches, each of which is operable so as to control actuation and cooking temperature of a respective one of said lower cooking members in said lower grill unit and said upper cooking member in a corresponding one of said upper halves;
    each of said lower cooking members further including
        a cooking plate having a cooking surface extending between said rear and front sides of said lower grill unit,
        a heating member disposed below said cooking plate, and
        a plurality of parallel uniformly spaced apart first and second grill ribs alternately disposed on said cooking surface, and extending between said front and rear sides of said lower grill unit, each of said first and second grill ribs having a top surface and a front end with a front edge terminating adjacent to said front side of said lower grill unit, said top surface of each of said first grill ribs having a flat portion extending horizontally from said rear side of said lower grill unit to a position adjacent to said front end of said first grill rib, and a curved portion extending curvedly and downwardly from said flat portion to said front edge of said first grill rib, said top surface of each of said second grill ribs having a flat portion extending horizontally from said rear side of said lower grill unit to a position adjacent to said front end of said second grill rib, and a curved portion extending curvedly and upwardly from said flat portion to said front edge of said second grill rib, said curved portions of said second ribs having an elevation higher than those of said flat portions of said first and second ribs so as to prevent a meat piece from sliding out of said lower grill unit when the meat piece is disposed on said flat portions of said first and second grill ribs.

2. The grill device as defined in claim 1, wherein said cooking surface of said cooking plate inclines gradually from said rear side toward said front side of said lower grill unit.

3. The grill device as defined in claim 1, further comprising a confining-wall disposed on said cooking surface of said cooking plate to confine said first and second grill ribs therein.

4. The grill device as defined in claim 1, further comprising an insulator spacer disposed between said lower cooking members so as to form two isolated cooking spaces that are confined by said upper halves and said lower cooking members.

* * * * *